(12) United States Patent
Ikard

(10) Patent No.: US 10,462,988 B2
(45) Date of Patent: Nov. 5, 2019

(54) AQUARIUM AQUAPONICS SYSTEM AND METHOD

(71) Applicant: Jack M. Ikard, Austin, TX (US)

(72) Inventor: Jack M. Ikard, Austin, TX (US)

(73) Assignee: AquaSprouts, LLC, Austin, TX (US)

( * ) Notice: Subject to any disclaimer, the term of this patent is extended or adjusted under 35 U.S.C. 154(b) by 117 days.

(21) Appl. No.: 15/502,097

(22) PCT Filed: Aug. 6, 2014

(86) PCT No.: PCT/US2014/049873
§ 371 (c)(1),
(2) Date: Feb. 6, 2017

(87) PCT Pub. No.: WO2016/022109
PCT Pub. Date: Feb. 11, 2016

(65) Prior Publication Data
US 2017/0223913 A1 Aug. 10, 2017

(51) Int. Cl.
*A01G 31/02* (2006.01)
*A01K 63/00* (2017.01)
(Continued)

(52) U.S. Cl.
CPC ............ *A01G 31/02* (2013.01); *A01K 63/006* (2013.01); *A01K 63/04* (2013.01); *A01K 63/045* (2013.01); *A01K 63/06* (2013.01); *Y02P 60/216* (2015.11)

(58) Field of Classification Search
CPC ................................ A01G 31/00; A01G 31/02
See application file for complete search history.

(56) References Cited

U.S. PATENT DOCUMENTS

| 3,769,935 A | 11/1973 | Johnson |
| 5,275,123 A | 1/1994 | Geung |

(Continued)

FOREIGN PATENT DOCUMENTS

| CN | 202524909 | 11/2012 |
| CN | 203105253 | 8/2013 |

(Continued)

OTHER PUBLICATIONS

Wood Worm Farms, Aquaponics Manual, 2013 (Year: 2013).*

(Continued)

*Primary Examiner* — Kristen C Hayes
(74) *Attorney, Agent, or Firm* — Lee & Hayes, P.C.

(57) ABSTRACT

An aquaponic housing unit fits over standard aftermarket aquariums. The system utilizes the natural symbiotic relationship between fish and plants to achieve adequate filtration for the aquarium below. A large planting container is elevated over the aquarium by two support legs so that the planting container is larger than the aquarium. The support legs can be used to hide wires or control boxes, along with using the legs as storage compartments or additional planting area. An aquarium pump delivers water to the planting container so that fish waste can be used as nutrients for plants in the container. The nitrogen cycle transforms the fish waste into useable nutrients for the plants, thus cleaning the water for the aquarium. The system can be used as a learning tool for students of all ages. It also creates a low maintenance, self-watering and self-fertilizing garden.

21 Claims, 7 Drawing Sheets

(51) Int. Cl.
*A01K 63/04* (2006.01)
*A01K 63/06* (2006.01)

(56) References Cited

U.S. PATENT DOCUMENTS

| | | | |
|---|---|---|---|
| 7,918,051 B2 | 4/2011 | Early | |
| 8,057,060 B2 | 11/2011 | Fredricks | |
| 8,966,816 B2* | 3/2015 | Toone | A01G 31/02 119/246 |
| 2005/0132971 A1 | 6/2005 | Sulski | |
| 2005/0204620 A1 | 9/2005 | Butterfield et al. | |
| 2010/0300369 A1 | 12/2010 | Fang et al. | |
| 2011/0131880 A1 | 6/2011 | Kloas et al. | |
| 2012/0111281 A1 | 5/2012 | Alshammary | |
| 2013/0047508 A1* | 2/2013 | Toone | A01G 31/02 47/62 R |
| 2014/0047767 A1 | 2/2014 | Bodlovich et al. | |
| 2014/0209034 A1* | 7/2014 | Lockwood | A01K 63/006 119/256 |
| 2014/0223818 A1* | 8/2014 | Coghlan | A01G 31/02 47/62 R |
| 2014/0223819 A1* | 8/2014 | Coghlan | A01K 63/045 47/62 R |
| 2015/0334996 A1* | 11/2015 | Licamele | A01K 63/003 119/246 |
| 2016/0135586 A1* | 5/2016 | Neudeck | A01K 63/006 312/114 |
| 2017/0071143 A1* | 3/2017 | Newsam | A01G 9/20 |

FOREIGN PATENT DOCUMENTS

| | | |
|---|---|---|
| CN | 203136700 | 8/2013 |
| CN | 203735199 | 7/2014 |
| DE | 8532480 | 3/1986 |
| JP | H04117225 | 4/1992 |
| JP | H05009245 | 2/1993 |
| JP | H05076248 | 10/1993 |
| JP | H07322782 | 12/1995 |
| JP | H11032625 | 2/1999 |
| KR | 20140023720 | 2/2014 |

OTHER PUBLICATIONS

Homestead_Laboratory, Aquaponics, Mar. 17, 2014 (Year: 2014).*
Japanese Office Action dated Mar. 12, 2019 for Japanese Patent Application No. 2017-527179, a counterpart of U.S. Appl. No. 15/502,097, 17 pages.
Extended European Search Report dated Mar. 6, 2018 for European Patent Application No. 14899092.2, 11 pages.
Hughey, "Aquaponics for Developing Countries", retrieved on Sep. 25, 2014 at <<http://aquaponics.com/media/docs/articles/Aquaponics-for-Developing-Countries.pdf>>, Jul.-Sep. 2005, Aquaponics Journal, Issue 38, p. 17 and 18.
Jake, "The Homestead Laboratory: Aquaponics (an online forum)", Jul.-Aug. 2013, retrieved on Sep. 25, 2014 at <<http://homesteadlaboratory.blogspot.com/search/label/Aquaponics>>, pp. 1, 4-6, 8-10.
PCT Search Report and Written Opinion for dated Oct. 27, 2014 for PCT Application No. PCT/US14/49873, 11 pages.
Wood Worm Farms, retrieved on Sep. 25, 2014 at <<http://web.archive.org/web/20120704110452/http://www.woodwormfarms.com/aquaponics_manual>>, Jul. 4, 2012, p. 4.
Australian Office Action dated Aug. 27, 2018 for Australian patent application No. 2014402790, a counterpart foreign application of U.S. Appl. No. 15/502,097, 7 pages.
Translated Japanese Office Action dated Jun. 5, 2018 for Japanese Patent Application No. 2017-527179, a counterpart foreign application of U.S. Appl. No. 15/502,097, 12 pages.

* cited by examiner

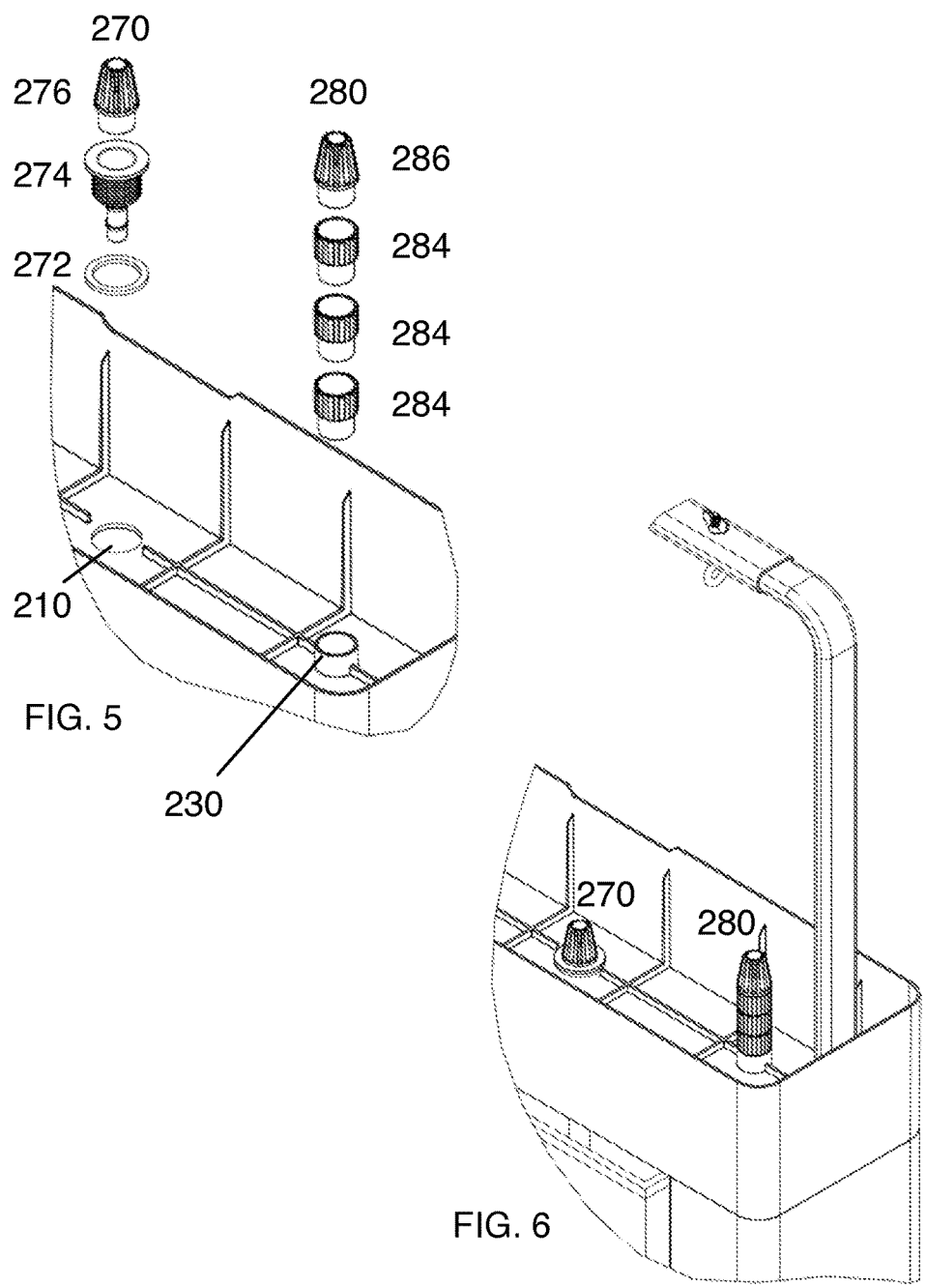

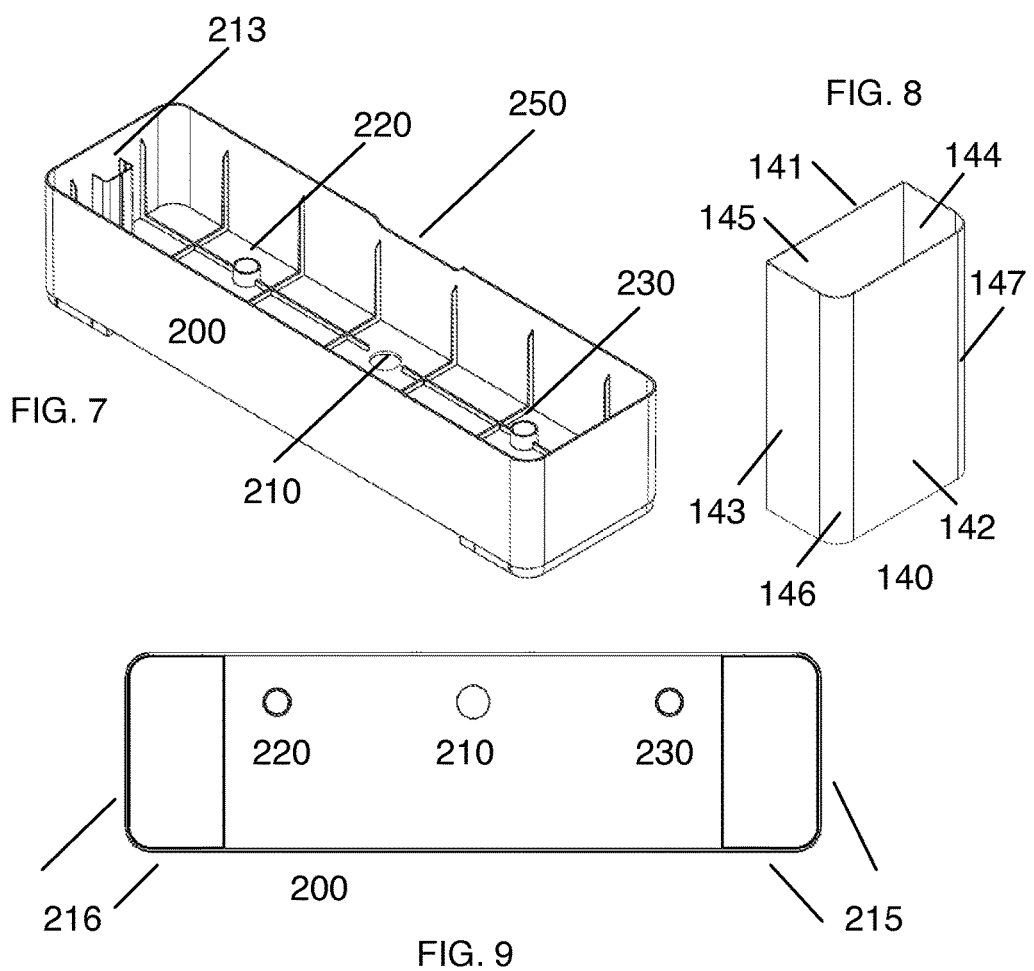

AQUARIUM AQUAPONICS SYSTEM AND METHOD

RELATED APPLICATIONS

This application is related to U.S. Provisional Patent application No. 61/862,909 filed Aug. 6, 2013 by applicant, and claims the priority of that filing date.

BACKGROUND

Field of the Invention

The field of invention relates to a symbiotic system that uses fish and plant growth to both clean the aquarium and produce fresh plants.

Prior Art

Some small-scale aquaponic systems on the market limit plant growth by their design. Other small-scale designs are entirely dependent of the aquarium or water tank for proper structural support of the aquaponic system.

SUMMARY

The present invention is directed to aquarium owners, aquaculture and aquaponic enthusiasts, along with home gardeners.

In one embodiment of the present invention, the system provides a stocked and fed aquarium with a self-cleaning system that uses natural cycles instead of traditional filtration methods to clean fish waste. The small scale aquaponic system can be modified to fit a variety of standard aquarium tanks.

In another aspect of the present invention, the system produces plants as an outcome of the filtration of fish waste through the nitrogen cycle.

In another embodiment of the present invention the system will fit over the aquarium so only a slight opening to the aquarium is available for access to water. The sides of the system will cover the sides of the aquarium, partially enclosing the aquarium's sides.

BRIEF DESCRIPTION OF THE DRAWINGS

These and other features, aspects, and advantages of the present invention will become better understood with regard to the following description, appended claims, and accompanying drawings where:

FIG. 5 is a detailed exploded top perspective view of a supply fitting and overflow fitting for the aquaponics system of FIG. 1.

FIG. 6 is a detailed top perspective view of a supply fitting and overflow fitting for the aquaponics system of FIG. 1.

FIG. 7 is a top perspective view of the planting container for the aquaponics system of FIG. 1.

FIG. 8 is a top perspective view of the first leg of the aquaponics system of FIG. 1.

FIG. 9 is a bottom view of the planting container of the aquaponics system of FIG. 1.

DETAILED DESCRIPTION

Figure 1:
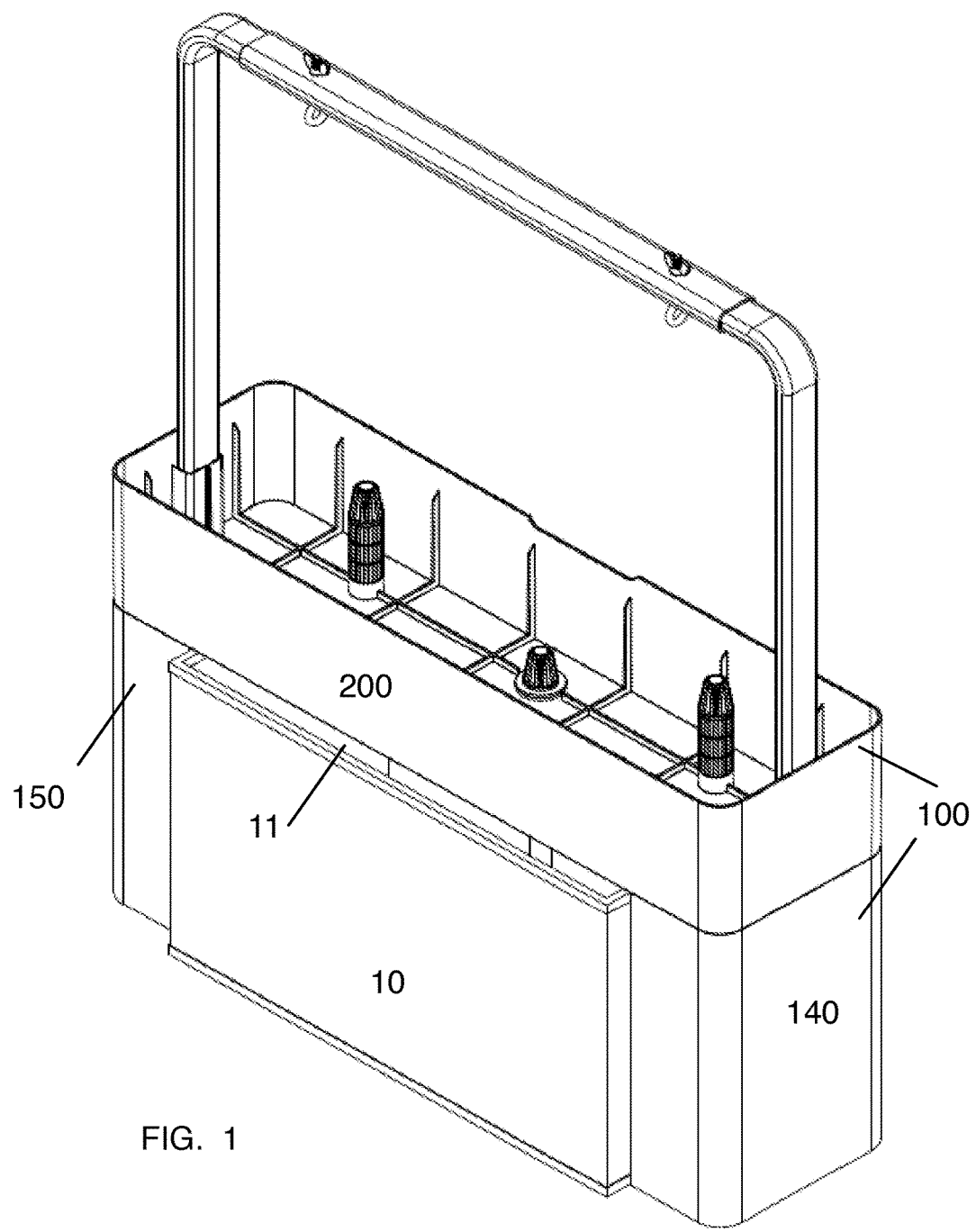
FIG. 1 is a front perspective view of an embodiment of an aquaponics system positioned over an aquarium.

The following list of example elements are shown in the figures:
  aquarium 10
  top 11, bottom 12, first side 13, second side 14, front 15, and rear 16 aquaponic system 100
  grow light support bar 120
    first grow light support leg 121
    second grow light support leg 122
    support arm 123
    Eye bolts 124 and nuts 125
  first leg 140
    top portion 141
    side surface 142
    front surface 143
    rear surface 144
    aquarium facing surface 145
    decorative bevels 146, 147
    removable storage compartment 300
      front panel 310
      tray 320
  second leg 150
  detachable grow light support bar 160
  planting container 200
    supply port 210
    reinforcing ribs 211
    grow light support leg bracket 212, 213
    first leg mounting ridge 215
    second leg mounting ridge 216
    drain port 220, 230
    overflow notch 250
    supply fitting assembly 270
      washer 272,
      bushing 274
      supply fitting 276
    drain fitting assembly 280
      washer 282
      bushing 284
      drain fitting 286
    pump 290
      supply tube 292

FIG. 1 is a front perspective view of an embodiment of an aquaponics system 100 positioned over an aquarium 10. In this embodiment, the aquaponics system comprises a planting container 200 that extends beyond the sides of the aquarium. In this example, a rectangular planting container 200 is supported by a first leg 140 and a second leg 150. In this example, the planting container may have other shapes such as oblong or kidney shaped.

In this example, a portion of the top front portion 11 of the aquarium is exposed. In other examples, by positioning the aquaponics system forward with respect to the aquarium, a rear top portion of the aquarium can be exposed in order to provide access to the aquarium, such as to feed fish.

Figure 2:
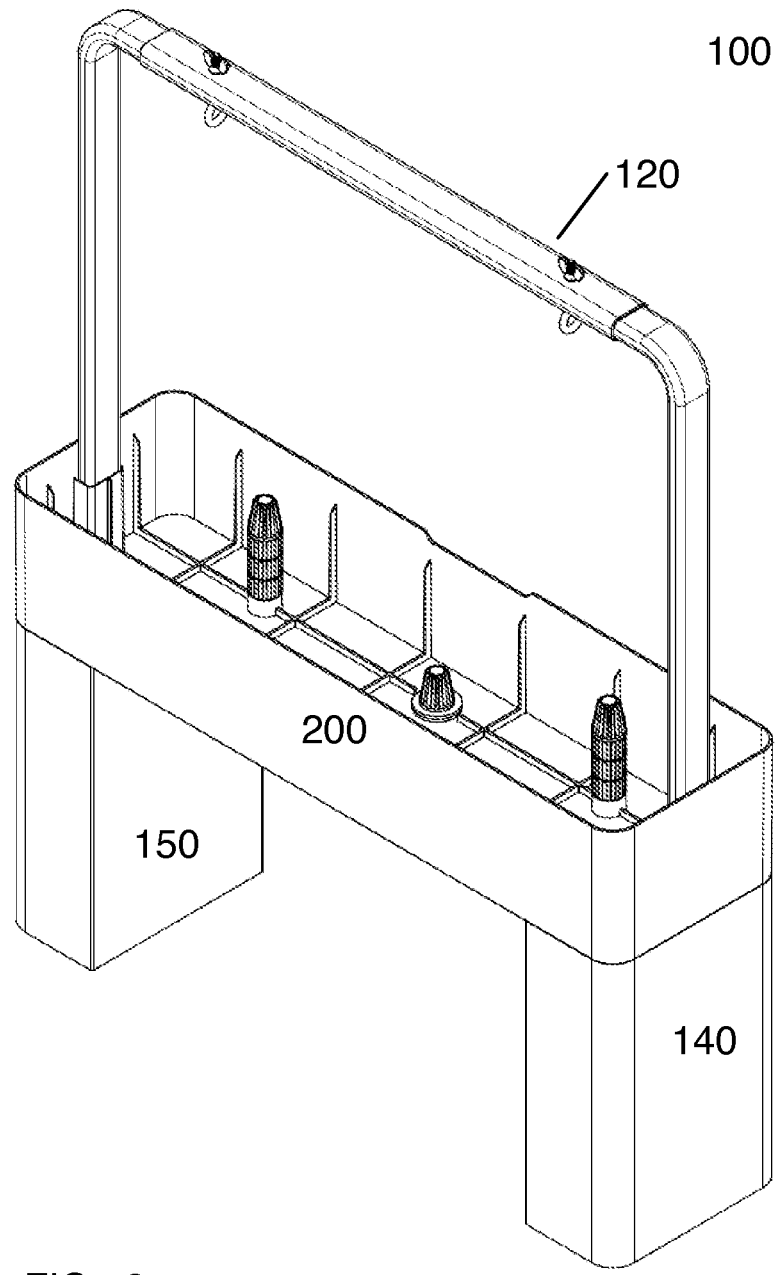
FIG. 2 is a front perspective view of the aquaponics system of FIG. 1.

FIG. 2 is a front perspective view of the aquaponics system 100 of FIG. 1. In this embodiment, the aquaponics system 100 comprises a first leg 140, a second leg 150, and a grow container 200, and a detachable grow light support bar 160. In this example, the legs are enclosed, and support the planting container is supported in a level position elevated over an aquarium. In other examples, the legs may provide shelves or cabinet storage, such as for aquarium supplies, or to conceal aquarium light and pump power cords.

Figure 3:
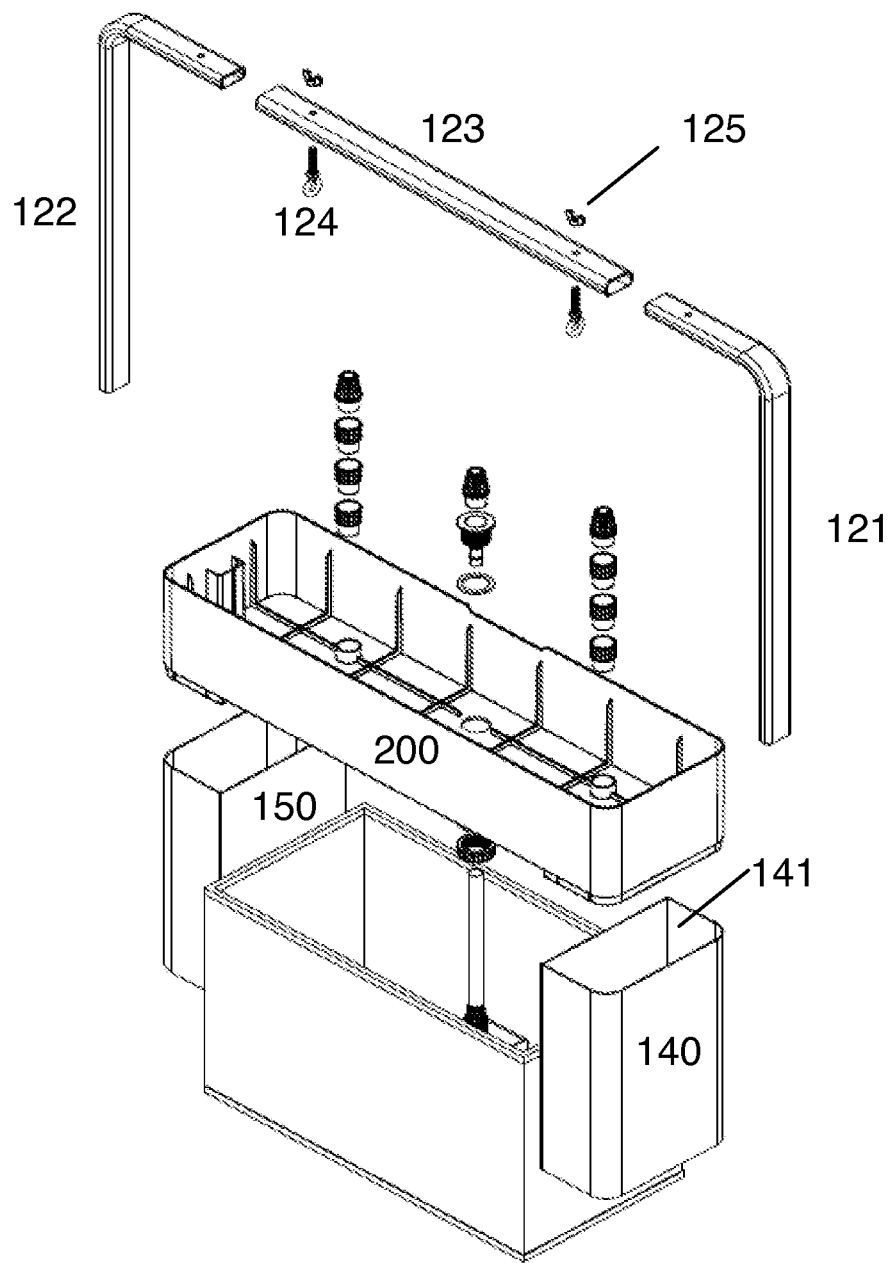
FIG. 3 is an exploded front perspective view of the aquaponics system of FIG. 1.

FIG. 3 is an exploded front perspective view of the aquaponics system of FIG. 1. First leg 140 has an open top 141 which fits over mounting ridges 215 on the bottom of the planting container so that the planting container may be removably secured to the first leg 140 and second leg 150 by press fit or snap attachment. These features, and similar features on the second leg, permit the planting container to be disassembled from the legs for transportation or storage. In this example, the legs are enclosed. In other examples, the legs may include one or more shelves or cabinets.

In this example, the detachable grow light support bar 120 is provided as an assembly comprising a first grow light support leg 121, a second grow light support leg 122, and a support arm 123. Eye bolts 124 and nuts 125 are used to secure the support arm 123 to the grow light support legs 121 and 122, and to support a grow light (not shown).

Figure 4:
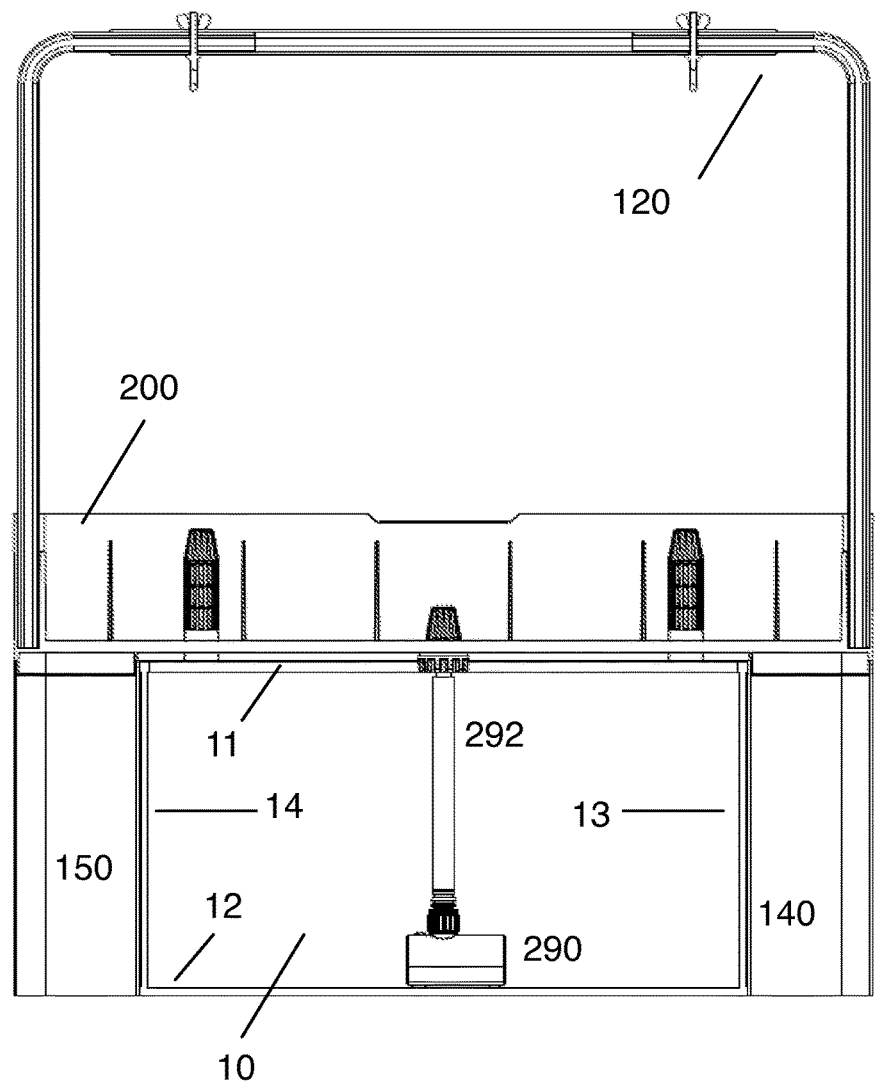
FIG. 4 is front cross section view of the aquaponics system of FIG. 1.

FIG. 4 is front cross section view of the aquaponics system of FIG. 1. The aquaponics system may be made of any sufficiently rigid and strong material such as high-strength plastic, metal, wood and the like. The various components of the aquaponic system can be made of different materials. The aquaponics system can be modified to fit a variety of different shapes, sizes and materials of aquarium tanks.

In this example, a rectangular aquarium 10 comprises top 11, bottom 12, first side 13, second side 14, front 15, and rear 16. The aquarium has a length of the distance between the first side and second side; a height and a width.

In this example, a submersible pump 290 pumps water to the planting container 200. Supply tube 292 directs water from the pump through planting container supply port 210. The pump 290 can be on a timer. Water is pumped from the aquarium 10 to the planting container where plants (not shown) take up nutrients from the water, and water is then drained back into the aquarium through drain ports through drain fitting assembly 280.

Support legs 140 and 150 can be configured to fit the aquarium 10 in a variety of ways. This example shows the legs 140 and 150 to have a beveled rectangular cross section. In other examples, the legs may have other polygonal or curved cross sections. In some examples, the legs may have a varying cross section with height, such as hourglass or twisting profiles.

In this example, the legs are hollow. In other examples, the legs may provide additional function, rather than just supporting the planting container. In some examples, the legs may have storage compartments with doors which allowing access to inside the legs, while still supporting the planting container. In some examples, the legs can serve as sump tanks, thereby allowing for water to remain at a constant level inside the aquarium through a bell-siphon plumbing system connected to inside the planting container system.

In this example, a pair of legs is provided. In other examples, three or more legs may be provided.

In one example, the height of legs 140 and 150 can be modified to be used as an additional grow bed for deeper rooting plants allowing for plumbing modifications. Legs 140 and 150 can also be used to grow mushrooms, such as by providing an irrigation system to one or both legs.

In this example, the support legs 140 and 150 support the planting container at height sufficient to permit the planting container to sit on the legs over the aquarium 10.

The planting container may be provided in a variety of depths, and a desired depth may be related to the size of the aquarium. Different depths in the planting container determine how big and what type of plants to be grown. Typically, the depth of the grow planting container can range from two inches to twelve inches. Other depths may be provided for efficient plant growth.

FIG. 5 is a detailed exploded top perspective view of a supply fitting assembly 270 and overflow fitting assembly 280. In this example, the supply fitting assembly 270 comprises a washer 272, a bushing 274 sized to snap into supply port 210, and a supply fitting 276. FIG. 5 shows one of two overflow fitting assemblies in the embodiment of FIG. 1. In this example, the overflow fitting assembly 280 comprises a plurality of stackable bushings 284 sized to snap into drain port 230, and a drain fitting 286. FIG. 6 is a detailed top perspective view of the assembled supply fitting assembly 270 and assembled drain fitting 280.

FIG. 7 is a top perspective view of the planting container 200 showing reinforcing ribs 211, supply port 210, and drain ports 220 and 230. In this example, the planting container 200 includes an overflow notch 250 on the rear top edge so that overflow water will drain back to the aquarium if the drains or drain ports become plugged. In this example, the planting container 200 is oversized with respect to the length of the aquarium. In other examples, the planting container may be positioned over the width of the aquarium. A first grow light support leg bracket 212 (not shown) and a second grow light support leg bracket 213 are provided to removably support grow light support legs.

FIG. 8 is a top perspective view of the first leg 140 showing a top portion 141, side surface 142, front surface 143, rear surface 144, aquarium facing surface 145, and decorative bevels 146 and 147.

FIG. 9 is a bottom view of the planting container 200 showing first leg mounting ridge 215 for mating with the top portion 141 of first leg 140; second leg mounting ridge 216 for mating with the top portion of second leg 150; supply port 210, and drain ports 220 and 230. In other examples, aquarium light mounting features may be provided on the bottom or side of the planting container, and an aquarium light can be supported by the planting container.

In other examples, side aquarium lights may be supported by one or more support leg. A recess may be provided on the inside surface of the support leg so that a side light may be recessed into the support leg.

Figure 10A:
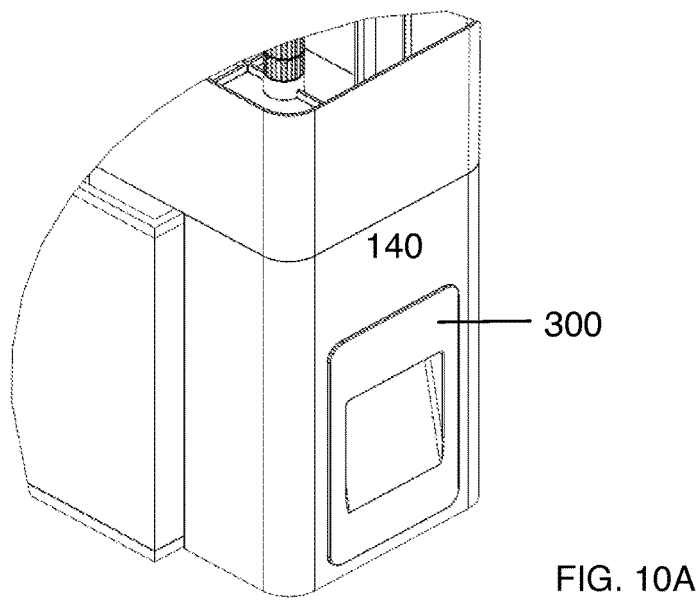
FIG. 10A is a side perspective view of a removable storage compartment provided in a support leg.
Figure 10B:
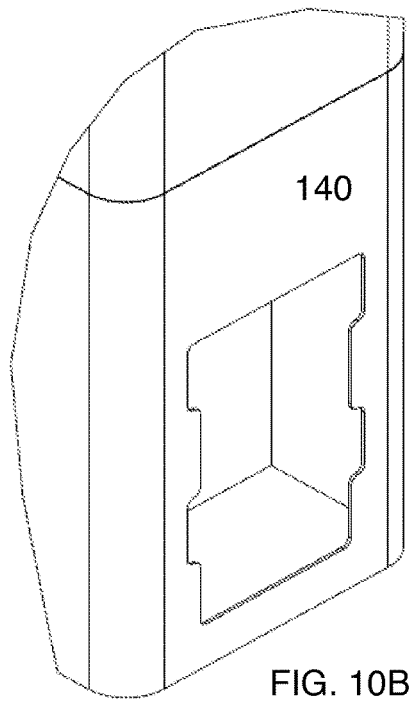
FIG. 10B is a side perspective view of the support leg of FIG. 10A with the removable storage compartment removed.
Figure 10C:
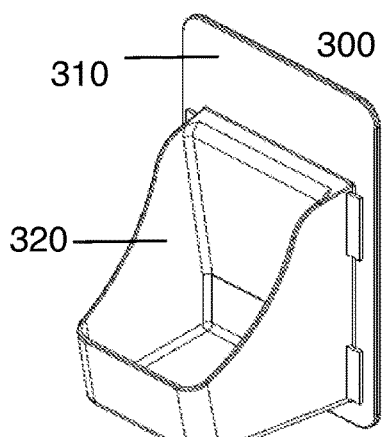
FIG. 10C is a rear perspective view of the storage compartment of FIG. 10A.

FIG. 10A is an example of a removable storage compartment 300 provided in a support leg 140. In this example, as shown in FIGS. 10B and 10C, a recessed handle is provided on the front panel 310 so that the 0 of the storage compartment 300 may be removed from the support leg in order to access contents if support tray 320. In other examples, one or more open shelves or a cabinet may be provided in the support legs.

In other examples, a filtration system may be provided so that particulates are removed from water supplied to the planting container. The filter can be made up of different materials including but not limited to: carbon pad/filter, sponge, and other filtration methods. Water may also be disinfected by ozone, UV light, or other methods.

In other examples, the aquaponic system can be used as a standalone hydroponic system and nutrients can be added to the planting container or a reservoir.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An aquaponic system comprising:
    an aquarium having a top, bottom, front, and rear, the aquarium having a length and a height;
    an aquarium pump;
    a first side support leg, the first side support leg further comprises at least one storage element;
    a second side support leg spaced apart from the first side support leg, such that the distance between the first side support leg and a second side support leg is greater than the length of the aquarium;
    a planting container releasably coupled to the first side support leg and the second side support leg, such that the first side support leg and the second side support leg are independently detachable from the planting container and wherein the planting container has a length greater than the length of the aquarium, the planting container supported by the first side support leg and the second side support leg at a height over the top of the aquarium, the planting container comprising a supply port in fluid communication with the aquarium pump, and a first drain port positioned above the aquarium.

2. The aquaponic system of claim 1 wherein the at least one storage element positioned below the planting container.

3. The aquaponic system of claim 2, wherein the first side support leg storage element is a reservoir, the reservoir different than the aquarium and the planting container.

4. The aquaponic system of claim 1, wherein the at least one storage element is a shelf.

5. The aquaponic system of claim 1, wherein the at least one storage element is a cabinet.

6. The aquaponic system of claim 1, wherein the at least one storage element is a reservoir positioned beneath the planting container, the reservoir different than the aquarium.

7. The aquaponic system of claim 1, further comprising a grow light support bar.

8. The aquaponic system of claim 7, wherein the grow light support bar is a detachable assembly comprising a first grow light support leg, a second grow light support leg, and a support arm.

9. The aquaponic system of claim 7, further comprising a grow light.

10. The aquaponic system of claim 1, wherein the planting container further comprises a water supply fitting assembly affixed to the supply port, the supply fitting assembly comprising washer, a bushing, and a supply fitting.

11. The aquaponic system of claim 1, further comprising a second water drain fitting assembly affixed to a second drain port.

12. The aquaponic system of claim 1, wherein the planting container further comprises an overflow notch.

13. The aquaponic system of claim 1, further comprising an aquarium light supported by the planting container, the aquarium light mounted below the planting container.

14. The aquaponic system of claim 1, further comprising an aquarium light mounted on a side support leg, the aquarium light mounted below the planting container.

15. The aquaponic system of claim 1, further comprising:
    a grow light positioned over the planting container; and
    an aquarium light mounted on one of the first side leg or the second side leg, the aquarium light positioned below the planting container.

16. The aquaponic system of claim 1, wherein the at least one storage element is configured to conceal an aquarium light or pump power cords.

17. The aquaponic system of claim 1, further comprising:
    a grow light positioned to provide light to contents of the planting container; and
    an aquarium light positioned to provide light to contents of the aquarium.

18. An aquaponic system for use with an aquarium comprising:
    a first side support leg, the first side support leg including a first storage element;
    a second side support leg spaced apart from the first side support leg, the second side support leg including a second storage element; and
    a planting container releasably coupled to a top surface of the first side support leg and a top surface of the second side support leg, such that the first side support leg and the second side support leg are detachable from the planting container, the planting container including at least one drain port in a bottom surface of the planting container.

19. A method of using an aquaponic system with an aquarium comprising:
    providing an aquaponic system comprising an aquarium pump, a first side support leg, a second side support leg, and a planting container having a supply port and at least one drain port, wherein the first side support leg includes an aquarium light;
    providing an aquarium having a top, bottom, front, and rear, the aquarium having a length and a height;
    positioning the first support leg such that that aquarium light illuminates the aquarium;
    positioning the second support leg spaced apart from and with respect to the first support leg such that the first support leg and the second support leg form a frame for the front of the aquarium;
    positioning the planting container over the top of the aquarium such that planting container extends beyond the length of the aquarium and the planting container is releasably supported by the first support leg and the second support leg;
    providing circulated water from the aquarium by delivering water from the aquarium pump through a supply tube to the supply port and draining water back to the aquarium from the drain port; and
    providing plants in the planting container, and filtering waste from the circulated water with the plants.

20. The aquaponic system of claim 17, further comprising a grow light assembly, the grow light assembly including:
- a first grow light support leg extending upward from the planting container;
- a second grow light support leg extending upward from the planting container;
- a grow light support bar detachably coupled to the first grow light support leg and the second grow light support leg; and
- a grow light detachably coupled to the grow light support bar.

21. The aquaponic system of claim 18, wherein the first storage element includes an aquarium light, the aquarium light positioned below the planting container.

* * * * *